(12) United States Patent
Kraynev et al.

(10) Patent No.: US 8,287,416 B2
(45) Date of Patent: Oct. 16, 2012

(54) EIGHT-SPEED PLANETARY LAYSHAFT TRANSMISSION

(75) Inventors: Alexander Filippovich Kraynev, Moscow (RU); Vladimir Konstantinovich Astashev, Moscow (RU); Konstantin Borisovich Salamandra, Moscow (RU); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 125 days.

(21) Appl. No.: 12/954,934

(22) Filed: Nov. 29, 2010

(65) Prior Publication Data

US 2011/0245029 A1     Oct. 6, 2011

(30) Foreign Application Priority Data

Mar. 31, 2010   (RU) ................. 2010112594

(51) Int. Cl.
    *F16H 37/02*     (2006.01)
(52) U.S. Cl. ............. 475/218; 475/221; 475/329
(58) Field of Classification Search ......... 475/198, 475/204, 207, 218, 221, 269, 329; 74/664, 74/665 R, 665 F, 665 G, 329, 331
    See application file for complete search history.

(56) References Cited

U.S. PATENT DOCUMENTS

| | | |
|---|---|---|
| 4,070,927 A | 1/1978 | Polak |
| 4,709,594 A | 12/1987 | Maeda |
| 5,106,352 A | 4/1992 | Lepelletier |
| 5,385,064 A | 1/1995 | Reece |
| 5,497,867 A | 3/1996 | Hirsch et al. |
| 5,560,461 A | 10/1996 | Loeffler |
| 5,599,251 A | 2/1997 | Beim et al. |
| 5,641,045 A | 6/1997 | Ogawa et al. |
| 5,651,435 A | 7/1997 | Perosky et al. |
| 5,975,263 A | 11/1999 | Forsyth |
| 6,053,839 A | 4/2000 | Baldwin et al. |

(Continued)

FOREIGN PATENT DOCUMENTS

BY    8590 C1    10/2006

(Continued)

OTHER PUBLICATIONS

Masami Kondo, Yoshio Hasegawa, Yoji Takanami, Kenji Arai, Masaharu Tanaka, Masafumi Kinoshita, Takeshi Ootsuki, Tetsuya Yamaguchi, Akira Fukatsu, "Toyota AA80E 8-Speed Automatic Transmission with Novel Powertrain Control System", SAE Technical Paper Series, Apr. 16-19, 2007, 2007-01-1311, Warrendale, PA 15096-0001 USA.

(Continued)

*Primary Examiner* — Justin Holmes
(74) *Attorney, Agent, or Firm* — Quinn Law Group, PLLC

(57) ABSTRACT

A transmission includes an input member, an output member, an intermediate member, and a planetary gear set, all of which are coaxial. A first and a second layshaft are arranged to define a second axis of rotation and a third axis of rotation, respectively. At least three sets of intermeshing gears are provided, some of which are arranged to transfer torque from the input member to the layshafts, and another of which is arranged to transfer torque from the layshafts to the intermediate member via engagement of different respective ones of seven torque-transmitting mechanisms. The seven torque-transmitting mechanisms are engagable in different combinations to establish up to eight forward speed ratios and a reverse speed ratio between the input member and the output member.

17 Claims, 2 Drawing Sheets

U.S. PATENT DOCUMENTS

| | | |
|---|---|---|
| 6,071,208 A | 6/2000 | Koivunen |
| 6,083,135 A | 7/2000 | Baldwin et al. |
| 6,217,474 B1 | 4/2001 | Ross et al. |
| 6,354,416 B1 | 3/2002 | Eo |
| 6,375,592 B1 | 4/2002 | Takahashi et al. |
| 6,422,969 B1 | 7/2002 | Raghavan et al. |
| 6,425,841 B1 | 7/2002 | Haka |
| 6,471,615 B1 | 10/2002 | Naraki et al. |
| 6,558,287 B2 | 5/2003 | Hayabuchi et al. |
| 6,623,397 B1 | 9/2003 | Raghavan et al. |
| 6,840,885 B2 | 1/2005 | Yi et al. |
| 7,070,534 B2 * | 7/2006 | Pelouch ............... 475/214 |
| 7,220,210 B2 | 5/2007 | Soh |
| 7,604,561 B2 | 10/2009 | Earhart |
| 2006/0014603 A1 | 1/2006 | Raghavan et al. |
| 2008/0045373 A1 * | 2/2008 | Rodgers, II ............... 475/319 |

FOREIGN PATENT DOCUMENTS

| | | |
|---|---|---|
| JP | 09-126283 A | 5/1997 |
| SU | 1204413 A1 | 1/1986 |
| WO | 03025431 A1 | 3/2003 |
| WO | 2006032312 A1 | 3/2006 |
| WO | 2006074707 A1 | 7/2006 |

OTHER PUBLICATIONS

Hirofumi Ota, Kazutoshi, Nozaki, Atsushi Honda, Masafumi Kinoshita, Toshihiko Aoki, Minoru Todo, Mikio Iwase, "Toyota's World First 8-Speed Automatic Transmission for Passenger Cars", SAE Technical Paper Series, Apr. 16-19, 2007, 2007-01-1101, Warrendale, PA 15096-0001 USA.

* cited by examiner

| GEAR STATE | GEAR RATIO | STEP RATIO | C1 | C2 | C3 | C4 | C5 | C6 | C7 |
|---|---|---|---|---|---|---|---|---|---|
| REV | -4.00 | | | | | X | | | X |
| 1ST | 4.14 | | X | | | | | X | |
| 2ND | 3.03 | 1.37 | | X | | | | X | |
| 3RD | 2.26 | 1.34 | | | X | | | X | |
| 4TH | 1.68 | 1.34 | | | | X | | X | |
| 5TH | 1.23 | 1.36 | X | | | | X | | |
| 6TH | 0.9 | 1.17 | | X | | | X | | |
| 7TH | 0.67 | 1.34 | | | X | | X | | |
| 8TH | 0.5 | 1.34 | | | | X | X | | |

| GEAR STATE | GEAR RATIO | STEP RATIO | C1A | C2A | C3A | C4A | C5A | C6A | C7A |
|---|---|---|---|---|---|---|---|---|---|
| REV | -3.69 | | X | | | | | | X |
| 1ST | 4.14 | | X | | | | | X | |
| 2ND | 3.03 | 1.37 | | X | | | | X | |
| 3RD | 2.26 | 1.34 | | | X | | | X | |
| 4TH | 1.68 | 1.34 | | | | X | | X | |
| 5TH | 1.23 | 1.36 | X | | | | X | | |
| 6TH | 0.9 | 1.17 | | X | | | X | | |
| 7TH | 0.67 | 1.34 | | | X | | X | | |
| 8TH | 0.5 | 1.34 | | | | X | X | | |

EIGHT-SPEED PLANETARY LAYSHAFT TRANSMISSION

CROSS-REFERENCE TO RELATED APPLICATION

This application claims the benefit of Russian Patent Application No. 2010112594, filed Mar. 31, 2010, which is hereby incorporated by reference in its entirety.

TECHNICAL FIELD

The invention relates to a multi-speed planetary transmission with layshafts, sets of intermeshing transfer gears, and a planetary gear set.

BACKGROUND OF THE INVENTION

Automotive vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising other than the most efficient point. Therefore, manually-shifted (layshaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improved the shift quality of the transmission by making the ratio interchanges substantially imperceptible to the operator under normal vehicle acceleration.

Multi-speed transmissions with greater than four speed ratios provide further improvements in acceleration and fuel economy over three- and four-speed transmissions. However, typical increased complexity, size and cost of such transmissions are competing factors which may prevent their use in some applications.

SUMMARY OF THE INVENTION

A multi-speed transmission is provided that utilizes a planetary gear set and torque transfer using sets of intermeshing gears and layshafts. The transmission includes an input member, an output member, and an intermediate member, all of which are coaxial. A stationary member, such as a transmission casing, is provided. The transmission further includes a planetary gear set. The input member, the output member, the intermediate member, and the simple planetary gear set are arranged coaxially with one another to define a first axis of rotation. A first and a second layshaft define a second axis of rotation and a third axis of rotation, respectively. The planetary gear set has a first member grounded to the stationary member, a second member connected for common rotation with the output member, and a third member. At least three sets of intermeshing gears are provided, some of which are arranged to transfer torque from the input member to the layshafts, and another of which is arranged to transfer torque from the layshafts to the intermediate member via engagement of different respective ones of seven torque-transmitting mechanisms. Each set of intermeshing gears is axially spaced from the other sets of intermeshing gears. The seven torque-transmitting mechanisms include a first, a second, a third, and a fourth torque-transmitting mechanism that are each selectively engagable to connect a respective gear of the sets of intermeshing gears for common rotation with a respective one of the layshafts, a fifth torque-transmitting mechanism selectively engagable to connect the intermediate member for common rotation with the second member of the planetary gear set, and a sixth torque-transmitting mechanism selectively engagable to connect the intermediate member for common rotation with the third member of the planetary gear set. The seven torque-transmitting mechanisms are engagable in different combinations to establish up to eight forward speed ratios and a reverse speed ratio between the input member and the output member.

As used herein, a "clutch" means a rotating-type clutch, or a stationary-type clutch, otherwise referred to as a brake. Different ones of the clutches may be friction clutches, synchronizers, band clutches, a selectively engagable one-way clutch, a dog clutch, or other types of clutches. As used herein, "common rotation" means rotation at the same speed (i.e., no relative rotation). As used herein, "gear ratio" is the ratio of the torque of the output member to the torque of the input member, while "speed ratio" is the ratio of the speed of the input member to the speed of the output member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
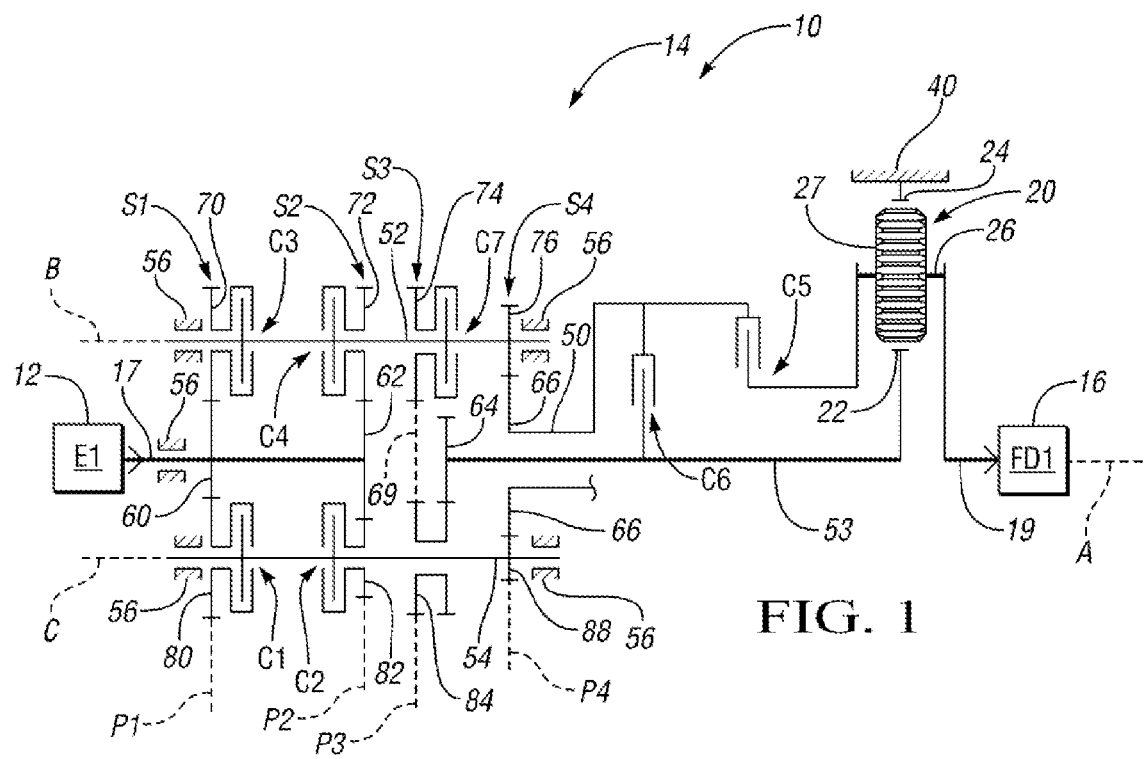
FIG. 1 is a schematic illustration in stick diagram form of a powertrain having a first embodiment of a multi-speed transmission.
FIG. 2 is a truth table depicting some of operating characteristics of the transmission shown in FIG. 1.

Referring to the drawings, wherein like reference numbers refer to like components, FIG. 1 shows the powertrain 10 with an engine 12 (labeled E1), a combination layshaft and planetary transmission 14, and a final drive mechanism 16 (labeled FD1). The engine 12 may be powered by various types of fuel to improve the efficiency and fuel economy of a particular application. Such fuels may include, for example gasoline, diesel, an ethanol, dimethyl ether, etc. The transmission 14 includes an input member 17 continuously connected with an output member of the engine 12, such as a crankshaft, optionally through a torque converter. The transmission 14 further includes four sets of intermeshing gears, described below, a first intermediate member 50, a first layshaft 52, a second layshaft 54, a second intermediate member 53, a planetary gear set 20, and an output member 19 connected with the final drive mechanism 16 for providing propulsion power to vehicle wheels.

The simple planetary gear set 20 includes a sun gear member 22, a ring gear member 24, and a carrier member 26 that rotatably supports a set of pinion gears 27. The pinion gears 27 mesh with sun gear member 22 and ring gear member 24. The ring gear member 24 is referred to as the first member of the planetary gear set 20 and is continuously grounded to the stationary member 40. The ring gear member 24 carries the highest torque load, reducing hydraulic requirements as it does so without hydraulic controls. The carrier member 26 is referred to as the second member of the simple planetary gear set 20 and is connected for common rotation with the output member 19. The sun gear member 22 is referred to as the third member of the simple planetary gear set 20 and is connected for common rotation with the second intermediate member 53.

The transmission 14 includes multiple shafts arranged to define three different axes of rotation A, B, and C. The input member 17, the output member 19, the intermediate members 50, 53 and the planetary gear set 20 are coaxial and define a first axis of rotation A. A first layshaft 52 and a second layshaft 54 are spaced parallel to the first axis of rotation A, and define a second axis of rotation B, and a third axis of rotation C, respectively.

A first set S1 of intermeshing gears includes gears 70, 60, and 80, which mesh in a first gear plane P1. Gear 60 is connected for rotation with input member 17. Gear 70 meshes with gear 60, and rotates concentrically about layshaft 52. Gear 80 meshes with gear 60 and rotates concentrically about layshaft 54. The input member 17, layshafts 52 and 54, intermediate members 50, 53, and output member 19 are supported for rotation by grounded bearings 56, some of which are shown.

A second set S2 of intermeshing gears includes gears 72, 62, and 82, which mesh in a second gear plane P2. Gear 62 is connected for rotation with input member 17. Gear 72 meshes with gear 62, and rotates concentrically about layshaft 52. Gear 82 meshes with gear 62 and rotates concentrically about layshaft 54.

A third set S3 of intermeshing gears includes gears 74, 84, and 64 which mesh in a third gear plane P3. Gear 74 rotates concentrically about layshaft 52. Gear 84 meshes with gear 74, as indicated by dashed line 69. The axes A, B, and C are arranged in a triangular formation, allowing gear 84 to mesh with gear 74. For clarity in the drawings, however, gears 74 and 84 are shown in the same plane as the drawing, with phantom line 69 indicating that they mesh. Gear 84 is depicted with two sets of teeth to indicate that it meshes with both gear 74 and gear 64. However, gear 84 may have one set of teeth with which both gear 74 and gear 64 mesh. Accordingly, gears 74, 84 and 64 may mesh in one plane P3.

A fourth set S4 of intermeshing gears includes gears 76, 66 and 88, which mesh in a fourth gear plane P4. Gear 66 is connected for rotation with intermediate member 50. Gear 76 is connected for rotation with layshaft 52 and meshes with gear 66. Gear 88 meshes with gear 66 and is connected for rotation with layshaft 54. The gear planes P1-P4 extend perpendicular to the drawing sheet in FIG. 1.

The transmission 14 further includes seven torque-transmitting mechanisms: a first torque-transmitting mechanism C1, a second torque-transmitting mechanism C2, a third torque-transmitting mechanism C3, a fourth torque-transmitting mechanism C4, a fifth torque-transmitting mechanism C5, a sixth torque-transmitting mechanism C6, and a seventh torque-transmitting mechanism C7. All of the torque-transmitting mechanisms C1, C2, C3, C4, C5, C6, and C7 are rotating-type clutches. The torque-transmitting mechanisms C1, C2, C3, C4 and C7 that are concentric with layshaft 52 or 54 may be synchronizers actuated by shift forks (not shown) as is understood by those skilled in the art. Torque-transmitting mechanisms C5 and C6 may be friction-type clutches, and may be referred to as output clutches as they direct torque flow through the planetary gear set 20 to the output member 19. By placing all of the friction-type clutches adjacent to one another, fluid routing requirements are simplified, as hydraulic fluid flow to the clutches C5 and C6 may be through mostly common feed channels. Simplifying the hydraulic feed channels and reducing the overall length of the feed channels simplifies production of the transmission 14 and may enable a smaller pump for the hydraulic system. Additionally, if only clutches C5 and C6 are friction-type clutches, then, according to the engagement chart of FIG. 2, discussed below, there would only be one open clutch in each speed ratio, limiting spin losses. Alternatively, torque-transmitting mechanisms C1, C2, C3, C4 and C7 may also be friction-type clutches, or torque-transmitting mechanisms C1 and C2 may be a double-sided synchronizer, torque-transmitting mechanisms C3 and C4 may be a double-sided synchronizer, and torque-transmitting mechanism C7 may be a single-sided synchronizer. The use of synchronizers in lieu of clutches reduces spin losses. In other embodiments, the torque-transmitting mechanisms may be still different types of clutches.

The first torque-transmitting mechanism C1, also referred to as clutch C1, is selectively engagable to connect gear 80 for common rotation with layshaft 54. The second torque-transmitting mechanism C2, also referred to as clutch C2, is selectively engagable to connect gear 82 for common rotation with layshaft 54. The third torque-transmitting mechanism C3, also referred to as clutch C3, is selectively engagable to connect gear 70 for common rotation with layshaft 52. The fourth torque-transmitting mechanism C4, also referred to as clutch C4, is selectively engagable to connect gear 72 for common rotation with the layshaft 52. The fifth torque-transmitting mechanism C5, also referred to as clutch C5, is a rotating-type clutch selectively engagable to connect gear 66 and intermediate member 50 for common rotation with carrier member 26. The sixth torque-transmitting mechanism C6, also referred to as clutch C6, is a rotating-type clutch selectively engagable to connect gear 66 and intermediate member 50 for common rotation with sun gear member 22. The seventh torque-transmitting mechanism C7, also referred to as clutch C7, is selectively engagable to connect gear 74 for common rotation with layshaft 52.

As shown in the truth table of FIG. 2, the torque-transmitting mechanisms C1, C2, C3, C4, C5, C6, and C7 are selectively engagable in combinations of two to provide up to eight forward gear ratios and a reverse gear ratio (listed as gear states) between the input member 17 and the output member 19. The gear ratio is the ratio of the torque of the output member 19 to the torque of the input member 17. A speed ratio corresponds with each gear ratio. The speed ratio is the ratio of the speed of the input member 17 to the speed of the output member 19.

The numerical gear ratios set forth in FIG. 2 result from gear tooth counts establishing the following gear ratios: the gear ratio of gear 60 to gear 66 across gear 80 and gear 88 is 1.23. The gear ratio of gear 62 to gear 66 across gear 82 and gear 88 is 0.9. The gear ratio of gear 60 to gear 66 across gear 70 and gear 76 is 0.67. The gear ratio of gear 62 to gear 66 across gear 72 and gear 76 is 0.5. The gear ratio of ring gear member 24 to sun gear member 22 is −2.36, assuming the carrier member 26 is stopped (for purposes of calculation only).

With the ratios of the gears listed above, there are five underdrive speed ratios (1st to 5th), and three overdrive speed ratios (6th and 8th) that result in the ratio steps listed in FIG. 2. As is apparent in FIG. 2, the ratio steps are relatively even in the third (2nd) through the eighth (8th) forward speed ratios, resulting in smooth shift feel and increased fuel efficiency as the engine 12 need only operate over a narrow range of speeds in each speed ratio.

Other gear tooth counts and corresponding gear ratios may be selected to accomplish speed ratios and ratio steps advantageous to the particular transmission application. A person of ordinary skill in the art of transmission design would understand how to select desirable tooth counts.

To establish the reverse speed ratio (REV), clutches C3 and C7 are engaged. Because clutch C3 is engaged, torque is transferred from the input member to layshaft 52 through intermeshing gears 60, 70. Because clutch C7 is engaged, torque is transferred from layshaft 52 through intermeshing gears 74, 84 and 64 along intermediate member 53 to sun gear member 22, and though planetary gear set 20 to output member 19. The output member 19 rotates in an opposite direction from the input member 17.

To establish the first speed ratio (1st), clutches C1 and C6 are engaged. Because clutch C1 is engaged, torque is transferred from the input member to layshaft 54 through intermeshing gears 60, 80. Torque is transferred from layshaft 54 to intermediate member 50 through intermeshing gears 88, 66. Because clutch C6 is engaged, torque is carried from intermediate member 50 to sun gear member 22, and through planetary gear set 20 to output member 19. Input member 17 and output member 19 rotate in the same direction, as in all of the forward speed ratios.

To establish the second speed ratio (2nd), clutches C2 and C6 are engaged. Because clutch C2 is engaged, torque is transferred from the input member to layshaft 54 through intermeshing gears 62, 82. Torque is transferred from layshaft 54 to intermediate member 50 through intermeshing gears 88, 66. Because clutch C6 is engaged, torque is carried from intermediate member 50 to sun gear member 22, and through planetary gear set 20 to output member 19. The shift from the first speed ratio to the second speed ratio is a single-transition shift.

To establish the third speed ratio (3rd), clutches C3 and C6 are engaged. Because clutch C3 is engaged, torque is carried from the input member 17 through intermeshing gears 60, 70 to layshaft 52, through intermeshing gears 76, 66 to intermediate member 50. Because clutch C6 is engaged, torque is carried from intermediate member 50 to sun gear member 22, and through planetary gear set 20 to output member 19. The shift from the second speed ratio to the third speed ratio is a single-transition shift.

To establish the fourth speed ratio (4th), clutches C4 and C6 are engaged. Because clutch C4 is engaged, torque is carried from the input member 17 through intermeshing gears 62, 72 to layshaft 52, through intermeshing gears 76, 66 to intermediate member 50. Because clutch C6 is engaged, torque is carried from intermediate member 50 to sun gear member 22, and through planetary gear set 20 to output member 19. The shift from the third speed ratio to the fourth speed ratio is a single-transition shift.

To establish the fifth speed ratio (5th), clutches C1 and C5 are engaged. Because clutch C1 is engaged, torque is transferred from the input member to layshaft 54 through intermeshing gears 60, 80. Torque is transferred from layshaft 54 to intermediate member 50 through intermeshing gears 88, 66. Because clutch C5 is engaged, torque is carried from intermediate member 50 to carrier member 26, and through planetary gear set 20 to output member 19. The shift from the fifth speed ratio to the sixth speed ratio is a double-transition shift.

To establish the sixth speed ratio (6th), clutches C2 and C5 are engaged. Because clutch C2 is engaged, torque is transferred from the input member to layshaft 54 through intermeshing gears 62, 82. Torque is transferred from layshaft 54 to intermediate member 50 through intermeshing gears 88, 66. Because clutch C5 is engaged, torque is carried from intermediate member 50 to carrier member 26, and through planetary gear set 20 to output member 19. The shift from the fifth speed ratio to the sixth speed ratio is a single-transition shift.

To establish the seventh speed ratio (7th), clutches C3 and C5 are engaged. Because clutch C3 is engaged, torque is carried from the input member 17 through intermeshing gears 60, 70 to layshaft 52, through intermeshing gears 76, 66 to intermediate member 50. Because clutch C5 is engaged, torque is carried from intermediate member 50 to carrier member 26, and through planetary gear set 20 to output member 19. The shift from the sixth speed ratio to the seventh speed ratio is a single-transition shift.

To establish the eight speed ratio (8th), clutches C4 and C5 are engaged. Because clutch C4 is engaged, torque is carried from the input member 17 through intermeshing gears 62, 72 to layshaft 52, through intermeshing gears 76, 66 to intermediate member 50. Because clutch C5 is engaged, torque is carried from intermediate member 50 to carrier member 26, and through planetary gear set 20 to output member 19. The shift from the seventh speed ratio to the eighth speed ratio is a single-transition shift. Accordingly, there is only one double-transition shift between the fourth and fifth forward speed ratios, and the remaining shifts are single-transition shifts. Double-transition shifts are more difficult to time than a single-transition shift so that torque disturbances are not apparent and a smooth shift feel is maintained.

Although eight forward speed ratios are available, the transmission 14 may be controlled to operate with only some of the available forward speed ratios. For example, the transmission 14 may be configured to operate as a six-speed transmission or a seven-speed transmission. The transmission 14 could also be operated with less than six forward speed ratios.

Figures 3, 4:
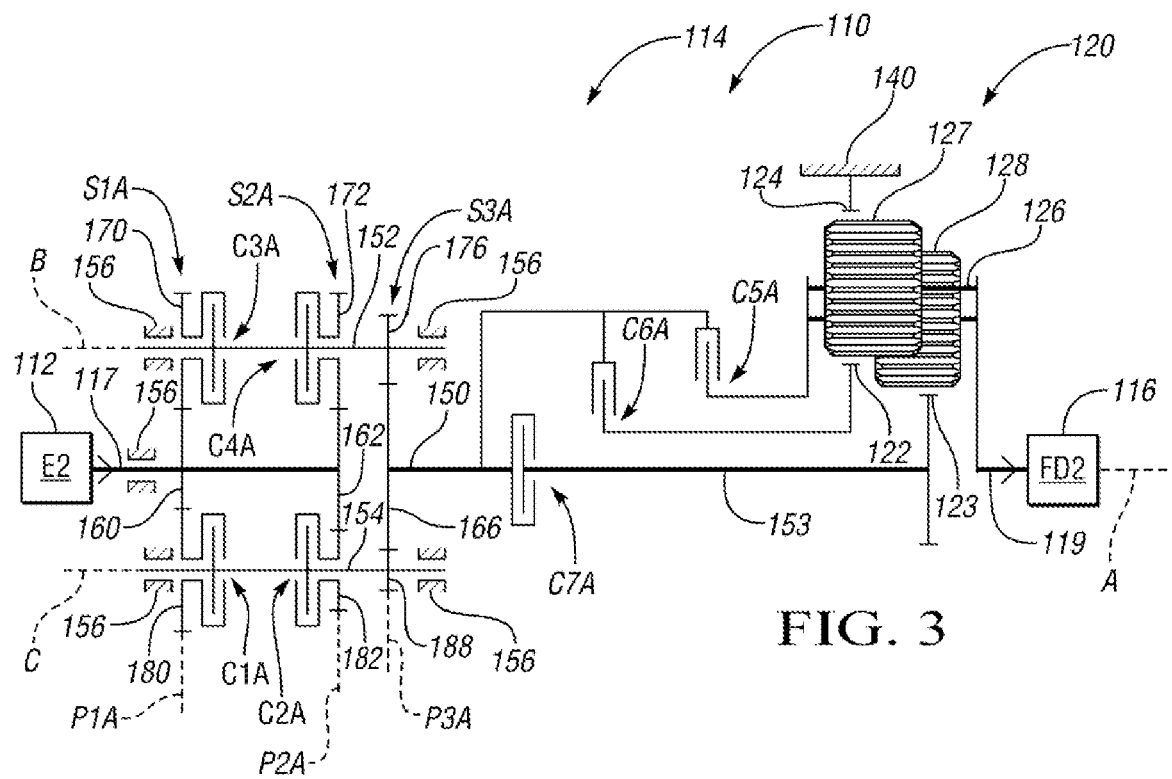
FIG. 3 is a schematic illustration in stick diagram form of a powertrain having a second embodiment of a multi-speed transmission.
FIG. 4 is a truth table depicting some of operating characteristics of the transmission shown in FIG. 3.

Referring to FIG. 3, a powertrain 110 with an engine 112 (labeled E2), a combination layshaft and planetary transmission 114, and a final drive mechanism 116 (labeled FD2). The engine 112 may be powered by various types of fuel to improve the efficiency and fuel economy of a particular application. Such fuels may include, for example gasoline, diesel, an ethanol, dimethyl ether, etc. The transmission 114 includes an input member 117 continuously connected with an output member of the engine 112, such as a crankshaft, optionally through a torque converter. The transmission 114 further includes four sets of intermeshing gears, described below, a first intermediate member 150, a first layshaft 152, a second layshaft 154, a second intermediate member 153, a compound planetary gear set 120, and an output member 119 connected with the final drive mechanism 116 for providing propulsion power to vehicle wheels.

The compound planetary gear set 120 includes a first sun gear member 122, a second sun gear member 123, a ring gear member 124, and a carrier member 126 that rotatably supports a first set of pinion gears 127 and a second set of pinion gears 128. The pinion gears 127 mesh with sun gear member 122 and ring gear member 124. Pinion gears 128 mesh with sun gear member 123 and pinion gears 127. The ring gear member 124 is referred to as the first member of the planetary gear set 120 and is continuously grounded to the stationary member 140. The ring gear member 124 carries the highest torque load, reducing hydraulic requirements as it does so without hydraulic controls. The carrier member 126 is referred to as the second member of the planetary gear set 120 and is connected for common rotation with the output member 119. The sun gear member 122 is referred to as the third member of the planetary gear set 120. The sun gear member 123 is referred to as the fourth member of the planetary gear set 120 and is connected for common rotation with the second intermediate member 153.

The transmission 114 includes multiple shafts arranged to define three different axes of rotation A, B, and C. The input member 117, the output member 119, the intermediate members 150, 153 and the planetary gear set 120 are coaxial and define a first axis of rotation A. A first layshaft 152 and a second layshaft 154 are spaced parallel to the first axis of rotation A, and define a second axis of rotation B, and a third axis of rotation C, respectively.

A first set S1A of intermeshing gears includes gears 170, 160, and 180, which mesh in a first gear plane P1A. Gear 160 is connected for rotation with input member 117. Gear 170 meshes with gear 160, and rotates concentrically about layshaft 152. Gear 180 meshes with gear 160 and rotates concentrically about layshaft 154. The input member 117, layshafts 152 and 154, intermediate members 150, 153, and output member 119 are supported for rotation by grounded bearings 156, some of which are shown.

A second set S2A of intermeshing gears includes gears 172, 162, and 182, which mesh in a second gear plane P2A. Gear 162 is connected for rotation with input member 117. Gear 172 meshes with gear 162, and rotates concentrically about layshaft 152. Gear 182 meshes with gear 162 and rotates concentrically about layshaft 154.

A third set S3A of intermeshing gears includes gears 176, 166 and 188 which mesh in a third gear plane P3A. Gear 166 is connected for rotation with intermediate member 150. Gear 176 is connected for rotation with layshaft 152 and meshes with gear 166. Gear 188 meshes with gear 166 and is connected for rotation with layshaft 154. The gear planes P1A-P3A extend perpendicular to the drawing sheet in FIG. 1.

The transmission 114 further includes seven torque-transmitting mechanisms: a first torque-transmitting mechanism C1A, a second torque-transmitting mechanism C2A, a third torque-transmitting mechanism C3A, a fourth torque-transmitting mechanism C4A, a fifth torque-transmitting mechanism C5A, a sixth torque-transmitting mechanism C6A, and a seventh torque-transmitting mechanism C7A. All of the torque-transmitting mechanisms C1A, C2A, C3A, C4A, C5A, C6A, and C7A are rotating-type clutches. The torque-transmitting mechanisms C1A, C2A, C3A, and C4A that are concentric with layshaft 152 or 154 may be synchronizers actuated by shift forks (not shown) as is understood by those skilled in the art. Torque-transmitting mechanism C7A may be a dog clutch as the intermediate shafts 150, 153 that it connects are axially aligned. Torque-transmitting mechanisms C5A and C6A may be friction-type clutches and may be referred to as output clutches as they direct torque flow through the planetary gear set 120 to the output member 119. By placing all of the friction-type clutches adjacent to one another, fluid routing requirements are simplified, as hydraulic fluid flow to the clutches C5A and C6A may be through mostly common feed channels. Simplifying the hydraulic feed channels and reducing the overall length of the feed channels simplifies production of the transmission 14 and may enable a smaller pump for the hydraulic system. Additionally, if only clutches C5A and C6A are friction-type clutches, then, according to the engagement chart of FIG. 4, discussed below, there would only be one open clutch in each speed ratio, limiting spin losses. Alternatively, torque-transmitting mechanisms C1A, C2A, C3A, C4A and C7A may also be friction-type clutches, or torque-transmitting mechanisms C1A and C2A may be a double-sided synchronizer, torque-transmitting mechanisms C3A and C4A may be a double-sided synchronizer, and torque-transmitting mechanism C7A may be a single-sided synchronizer. The use of synchronizers in lieu of clutches reduces spin losses. In other embodiments, the torque-transmitting mechanisms may be still different types of clutches.

The first torque-transmitting mechanism C1A, also referred to as clutch C1A, is selectively engagable to connect gear 180 for common rotation with layshaft 154. The second torque-transmitting mechanism C2A, also referred to as clutch C2A, is selectively engagable to connect gear 182 for common rotation with layshaft 154. The third torque-transmitting mechanism C3A, also referred to as clutch C3A, is selectively engagable to connect gear 170 for common rotation with layshaft 152. The fourth torque-transmitting mechanism C4A, also referred to as clutch C4A, is selectively engagable to connect gear 172 for common rotation with the layshaft 152. The fifth torque-transmitting mechanism C5A, also referred to as clutch C5A, is a rotating-type clutch selectively engagable to connect gear 166 and intermediate member 150 for common rotation with carrier member 126. The sixth torque-transmitting mechanism C6A, also referred to as clutch C6A, is a rotating-type clutch selectively engagable to connect gear 166 and intermediate member 150 for common rotation with sun gear member 122. The seventh torque-transmitting mechanism C7A, also referred to as clutch C7A, is selectively engagable to connect gear 166 and intermediate member 150 for common rotation with intermediate member 153. As shown in the truth table of FIG. 4, the torque-transmitting mechanisms C1A, C2A, C3A, C4A, C5A, C6A, and C7A are selectively engagable in combinations of two to provide up to eight forward speed ratios and a reverse speed ratio (listed as gear states).

The numerical gear ratios set forth in FIG. 4 result from gear tooth counts establishing the following gear ratios: the gear ratio of gear 160 to gear 166 across gear 180 and gear 188 is 1.23. The gear ratio of gear 162 to gear 166 across gear 182 and gear 188 is 0.9. The gear ratio of gear 160 to gear 166 across gear 170 and gear 176 is 0.67. The gear ratio of gear 162 to gear 166 across gear 172 and gear 176 is 0.5. The gear ratio of ring gear member 124 to sun gear member 122 is −2.36, assuming the carrier member 126 is stopped (for purposes of calculation only). The gear ratio of ring gear member 124 to sun gear member 123 is 4.0, assuming the carrier member 126 is stopped (for purposes of calculation only).

With the ratios of the gears listed above, there are five underdrive speed ratios (1st to 5th), and three overdrive speed ratios (6th and 8th) that result in the ratio steps listed in FIG. 4. As is apparent in FIG. 4, the ratio steps are relatively even in the third (2nd) through the eighth (8th) forward speed ratios, resulting in smooth shift feel and increased fuel efficiency as the engine 112 need only operate over a narrow range of speeds in each speed ratio.

Other gear tooth counts and corresponding gear ratios may be selected to accomplish speed ratios and ratio steps advantageous to the particular transmission application. A person of ordinary skill in the art of transmission design would understand how to select desirable tooth counts.

To establish the reverse speed ratio (REV), clutches C1A and C7A are engaged. Because clutch C1A is engaged, torque is transferred from the input member 117 to layshaft 154 through intermeshing gears 160, 180 and to intermediate member 150 through intermeshing gears 188, 166. Because clutch C7 is engaged, torque is transferred from intermediate member 150 to intermediate member 153 and sun gear member 123, and though planetary gear set 120 to output member 119. The output member 119 rotates in an opposite direction from the input member 117.

To establish the first speed ratio (1st), clutches C1A and C6A are engaged. Because clutch C1A is engaged, torque is transferred from the input member 117 to layshaft 154 through intermeshing gears 160, 180. Torque is transferred from layshaft 154 to intermediate member 150 through intermeshing gears 188, 166. Because clutch C6A is engaged, torque is carried from intermediate member 150 to sun gear member 122, and through planetary gear set 120 to output member 119. Input member 117 and output member 119 rotate in the same direction, as in all of the forward speed ratios.

To establish the second speed ratio (2nd), clutches C2A and C6A are engaged. Because clutch C2A is engaged, torque is transferred from the input member 117 to layshaft 154 through intermeshing gears 162, 182. Torque is transferred from layshaft 154 to intermediate member 150 through intermeshing gears 188, 166. Because clutch C6A is engaged, torque is carried from intermediate member 150 to sun gear member 122, and through planetary gear set 120 to output member 119. The shift from the first speed ratio to the second speed ratio is a single-transition shift.

To establish the third speed ratio (3rd), clutches C3A and C6A are engaged. Because clutch C3A is engaged, torque is carried from the input member 117 through intermeshing gears 160, 170 to layshaft 152, through intermeshing gears 176, 166 to intermediate member 150. Because clutch C6A is engaged, torque is carried from intermediate member 150 to sun gear member 122, and through planetary gear set 120 to output member 119. The shift from the second speed ratio to the third speed ratio is a single-transition shift.

To establish the fourth speed ratio (4th), clutches C4A and C6A are engaged. Because clutch C4A is engaged, torque is carried from the input member 117 through intermeshing gears 162, 172 to layshaft 152, through intermeshing gears 176, 166 to intermediate member 150. Because clutch C6A is engaged, torque is carried from intermediate member 150 to sun gear member 122, and through planetary gear set 120 to output member 119. The shift from the third speed ratio to the fourth speed ratio is a single-transition shift.

To establish the fifth speed ratio (5th), clutches C1A and C5A are engaged. Because clutch C1A is engaged, torque is transferred from the input member 117 to layshaft 154 through intermeshing gears 160, 180. Torque is transferred from layshaft 154 to intermediate member 150 through intermeshing gears 188, 166. Because clutch C5A is engaged, torque is carried from intermediate member 150 to carrier member 126, and through planetary gear set 120 to output member 119. The shift from the fifth speed ratio to the sixth speed ratio is a double-transition shift.

To establish the sixth speed ratio (6th), clutches C2A and C5A are engaged. Because clutch C2A is engaged, torque is transferred from the input member 117 to layshaft 154 through intermeshing gears 162, 182. Torque is transferred from layshaft 154 to intermediate member 150 through intermeshing gears 188, 166. Because clutch C5A is engaged, torque is carried from intermediate member 150 to carrier member 126, and through planetary gear set 120 to output member 119. The shift from the fifth speed ratio to the sixth speed ratio is a single-transition shift.

To establish the seventh speed ratio (7th), clutches C3A and C5A are engaged. Because clutch C3A is engaged, torque is carried from the input member 117 through intermeshing gears 160, 170 to layshaft 152, through intermeshing gears 176, 166 to intermediate member 150. Because clutch C5A is engaged, torque is carried from intermediate member 150 to carrier member 126, and through planetary gear set 120 to output member 119. The shift from the sixth speed ratio to the seventh speed ratio is a single-transition shift.

To establish the eight speed ratio (8th), clutches C4A and C5A are engaged. Because clutch C4A is engaged, torque is carried from the input member 117 through intermeshing gears 162, 172 to layshaft 152, through intermeshing gears 176, 166 to intermediate member 150. Because clutch C5A is engaged, torque is carried from intermediate member 150 to carrier member 126, and through planetary gear set 120 to output member 119. The shift from the seventh speed ratio to the eighth speed ratio is a single-transition shift. Accordingly, there is only one double-transition shift between the fourth and fifth forward speed ratios, and the remaining shifts are single-transition shifts.

Although eight forward speed ratios are available, the transmission 14 may be controlled to operate with only some of the available forward speed ratios. For example, the transmission 14 may be configured to operate as a six-speed transmission or a seven-speed transmission. The transmission 14 could also be operated with less than six forward speed ratios.

The powertrain 10 or 110 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 or 112 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:
1. A multi-speed transmission comprising:
an input member;
an output member;
a stationary member;
an intermediate member;
a planetary gear set having a first member, a second member and a third member; wherein the first member is grounded to the stationary member, and the second member is connected for common rotation with the output member;
wherein the input member, the output member, the intermediate member, and the planetary gear set are arranged coaxially with one another to define a first axis of rotation;

a first and a second layshaft defining a second axis of rotation and a third axis of rotation, respectively;

seven selectively engagable torque-transmitting mechanisms;

at least three sets of intermeshing gears, some of which are arranged to transfer torque from the input member to the layshafts, and another of which is arranged to transfer torque from the layshafts to the intermediate member via engagement of different respective ones of the torque-transmitting mechanisms; each set of intermeshing gears being axially spaced from the other sets of intermeshing gears;

wherein the seven torque-transmitting mechanisms include a first, a second, a third, and a fourth torque-transmitting mechanism that are each selectively engagable to connect a respective gear of the sets of intermeshing gears for common rotation with a respective one of the layshafts, a fifth torque-transmitting mechanism selectively engagable to connect the intermediate member for common rotation with the second member of the planetary gear set, and a sixth torque-transmitting mechanism selectively engagable to connect the intermediate member for common rotation with the third member of the planetary gear set; and wherein the seven torque-transmitting mechanisms are engagable in different combinations to establish up to eight forward speed ratios and a reverse speed ratio between the input member and the output member.

2. The multi-speed transmission of claim 1, wherein the seven torque-transmitting mechanisms include a seventh torque-transmitting mechanism that is selectively engagable in combination with one of the first, the second, the third, and the fourth torque-transmitting mechanisms to transfer torque from the input member through one of the sets of intermeshing gears and the planetary gear set to the output member at the reverse speed ratio.

3. The multi-speed transmission of claim 2, wherein the planetary gear set is a compound planetary gear set and has a fourth member; wherein the seventh torque-transmitting mechanism is selectively engagable to connect the intermediate member for common rotation with the fourth member.

4. The multi-speed transmission of claim 1, wherein one of the first, the second, the third, and the fourth torque-transmitting mechanisms and one of the fifth and the sixth torque-transmitting mechanisms is engaged in each of the forward speed ratios.

5. The multi-speed transmission of claim 4, wherein the first, the second, the third, and the fourth torque-transmitting mechanisms are engaged in successive order along with the sixth torque-transmitting mechanism to establish a first, a second, a third, and a fourth of the eight forward speed ratios; and wherein the first, the second, the third, and the fourth torque-transmitting mechanisms are engaged in successive order along with the fifth torque-transmitting mechanism to establish a fifth, a sixth, a seventh, and an eighth of the eight forward speed ratios, the first, second, third, fourth, fifth, sixth, seventh, and eighth forward speed ratios being in successive numerical order.

6. The multi-speed transmission of claim 4, wherein the first, the second, the third, and the fourth torque-transmitting mechanisms are synchronizers and the fifth and the sixth torque-transmitting mechanisms are friction-type clutches.

7. The multi-speed transmission of claim 6, wherein the first and the second torque-transmitting mechanisms are a double-sided synchronizer selectively engagable to connect different ones of the gears rotatable about the second layshaft for common rotation with the second layshaft; and wherein the third and the fourth torque-transmitting mechanisms are another double-sided synchronizer selectively engagable to connect different ones of the gears rotatable about the first layshaft for common rotation with the first layshaft.

8. The multi-speed transmission of claim 1, wherein the seven torque-transmitting mechanisms are engagable in different combinations of two to establish eight forward speed ratios and a reverse speed ratio between the input member and the output member with only one of the shifts between subsequent forward speed ratios being a double-transition shift and the rest of the shifts between subsequent forward speed ratios being single transition shifts.

9. The multi-speed transmission of claim 1, wherein a first set and a second set of the five sets of intermeshing gears each include a respective gear connected for common rotation with the input member, a respective gear rotatable about the first layshaft and a respective gear rotatable about the second layshaft; wherein the first and the second torque-transmitting mechanisms are each respectively selectively engagable to connect a respective one of the gears rotatable about the first layshaft for common rotation with the first layshaft; and wherein the third and the fourth torque-transmitting mechanisms are each respectively selectively engagable to connect a respective one of the gears rotatable about the second layshaft for common rotation with the second layshaft.

10. The multi-speed transmission of claim 1, wherein the first member of the planetary gear set is a ring gear member, the third member of the planetary gear set is a sun gear member, and the second member of the planetary gear set is a carrier member that rotatably supports a set of pinion gears that mesh with both the ring gear member and the sun gear member.

11. The multi-speed transmission of claim 1, wherein the planetary gear set is a compound planetary gear set having a ring gear member, a first sun gear member, a second sun gear member, and a carrier member that rotatably supports a first set of pinion gears that mesh with the ring gear member and the first sun gear member and a second set of pinion gears that mesh with the second sun gear member and the first set of pinion gears; and wherein the first member of the planetary gear set is the ring gear member, the second member of the planetary gear set is the carrier member, and the third member of the planetary gear set is the first sun gear member.

12. The multi-speed transmission of claim 1, wherein the seven torque-transmitting mechanisms are all rotating-type clutches.

13. A multi-speed transmission comprising:

an input member;

an output member;

a stationary member;

an intermediate member;

a planetary gear set having a first member, a second member and a third member; wherein the first member is grounded to the stationary member, and the second member is connected for common rotation with the output member;

wherein the input member, the output member, the intermediate member, and the planetary gear set are arranged coaxially with one another to define a first axis of rotation;

a first and a second layshaft defining a second axis of rotation and a third axis of rotation, respectively;

seven selectively engagable torque-transmitting mechanisms;

at least three sets of intermeshing gears, some of which are arranged to transfer torque from the input member to the layshafts, and another of which is arranged to transfer torque from the layshafts to the intermediate member via engagement of different respective ones of the torque-transmitting mechanisms; each set of intermeshing gears being axially spaced from the other sets of intermeshing gears;

wherein the seven torque-transmitting mechanisms include a first, a second, a third, and a fourth torque-transmitting mechanism that are each selectively engagable to connect a respective gear of the sets of intermeshing gears for common rotation with a respective one of the layshafts, a fifth torque-transmitting mechanism selectively engagable to connect the intermediate member for common rotation with the second member of the planetary gear set, a sixth torque-transmitting mechanism selectively engagable to connect the intermediate member for common rotation with the third member of the planetary gear set, and a seventh torque-transmitting mechanism selectively engagable to connect a gear of one of the sets of intermeshing gears for common rotation with the first layshaft to thereby permit torque transfer from the first layshaft to the third member through the one of the sets of intermeshing gears; and wherein the seven torque-transmitting mechanisms are engagable in combinations of two to establish up to eight forward speed ratios and a reverse speed ratio between the input member and the output member with only one shift between subsequent ones of the forward speed ratios being a double-transition shift and the remaining shifts between subsequent ones of the forward speed ratios being single-transition shifts.

14. The multi-speed transmission of claim 13, wherein one of the first, the second, the third, and the fourth torque-transmitting mechanisms and one of the fifth and the sixth torque-transmitting mechanisms is engaged in each of the forward speed ratios.

15. The multi-speed transmission of claim 14, wherein the first, the second, the third, and the fourth torque-transmitting mechanisms are synchronizers and the fifth and the sixth torque-transmitting mechanisms are friction-type clutches.

16. The multi-speed transmission of claim 15, wherein the first and the second torque-transmitting mechanisms are a double-sided synchronizer selectively engagable to connect different ones of the gears rotatable about the first layshaft for common rotation with the first layshaft; and wherein the third and the fourth torque-transmitting mechanisms are another double-sided synchronizer selectively engagable to connect different ones of the gears rotatable about the second layshaft for common rotation with the second layshaft.

17. A multi-speed transmission comprising:
an input member;
an output member;
a stationary member;
an intermediate member;
a compound planetary gear set having a ring gear member grounded to the stationary member, a first sun gear member, a second sun gear member, a carrier member connected for common rotation with the output member; wherein the carrier member rotatably supports a first set of pinion gears that meshes with the first sun gear member and with the ring gear member and a second set of pinion gears that meshes with the second sun gear member and with the first set of pinion gears;
wherein the input member, the output member, the intermediate member, and the planetary gear set are arranged coaxially with one another to define a first axis of rotation;
a first and a second layshaft defining a second axis of rotation and a third axis of rotation, respectively;
seven selectively engagable torque-transmitting mechanisms;
at least three sets of intermeshing gears, some of which are arranged to transfer torque from the input member to the layshafts, and another of which is arranged to transfer torque from the layshafts to the intermediate member via engagement of different respective ones of the torque-transmitting mechanisms; each set of intermeshing gears being axially spaced from the other sets of intermeshing gears;
wherein the seven torque-transmitting mechanisms include a first, a second, a third, and a fourth torque-transmitting mechanism that are each selectively engagable to connect a respective gear of the sets of intermeshing gears for common rotation with a respective one of the layshafts, a fifth torque-transmitting mechanism and a sixth torque-transmitting mechanism selectively engagable to connect the intermediate member for common rotation with the carrier member and the first sun gear member, respectively, and a seventh torque-transmitting mechanism that is selectively engagable to connect the intermediate member for common rotation with the second sun gear member; and wherein the seven torque-transmitting mechanisms are engagable in different combinations to establish up to eight forward speed ratios and a reverse speed ratio between the input member and the output member.

* * * * *